United States Patent
Hsu (10) Patent No.: US 11,943,220 B2
(45) Date of Patent: Mar. 26, 2024

(54) SMART DEVICE IDENTITY RECOGNITION METHOD AND SYSTEM, ELECTRONIC DEVICE, AND STORAGE MEDIUM

(71) Applicant: MIDEA GROUP CO., LTD., Foshan (CN)

(72) Inventor: Hsiang-Chih Hsu, Foshan (CN)

(73) Assignee: MIDEA GROUP CO., LTD., Foshan (CN)

( * ) Notice: Subject to any disclaimer, the term of this patent is extended or adjusted under 35 U.S.C. 154(b) by 301 days.

(21) Appl. No.: 17/614,362

(22) PCT Filed: Dec. 31, 2019

(86) PCT No.: PCT/CN2019/130399
§ 371 (c)(1),
(2) Date: Nov. 25, 2021

(87) PCT Pub. No.: WO2021/103269
PCT Pub. Date: Jun. 3, 2021

(65) Prior Publication Data
US 2022/0239646 A1    Jul. 28, 2022

(30) Foreign Application Priority Data

Nov. 25, 2019 (CN) .......................... 201911167125.2

(51) Int. Cl.
*H04L 9/40*    (2022.01)
*H04L 9/32*    (2006.01)

(52) U.S. Cl.
CPC .......... *H04L 63/0876* (2013.01); *H04L 63/12* (2013.01); *H04L 63/166* (2013.01);
(Continued)

(58) Field of Classification Search
CPC ....... H04L 9/32; H04L 63/0272; H04L 63/08; H04L 63/0876; H04L 63/12; H04L 63/1466; H04L 63/166; H04L 2463/081
See application file for complete search history.

(56) References Cited

U.S. PATENT DOCUMENTS

| 2016/0043865 A1 | 2/2016 | Matsakis |
| 2018/0083777 A1 | 3/2018 | Dai |

(Continued)

FOREIGN PATENT DOCUMENTS

| CN | 108833541 A | 11/2018 |
| CN | 109474691 A | 3/2019 |

(Continued)

OTHER PUBLICATIONS

Meidan, Yair, et al. "ProfilIoT: A machine learning approach for IoT device identification based on network traffic analysis." Proceedings of the symposium on applied computing. 2017. (Year: 2017).*

(Continued)

*Primary Examiner* — Thomas J Dailey (57) ABSTRACT

A smart device identity recognition method and system, an electronic device, and a storage medium, are described. The method includes determining a first data randomness degree of inter-packet difference data in a network data packet sent by a smart device to be identified; and determining the identity of said smart device according to a comparison result between the first data randomness degree and a second data randomness degree, and the second data randomness degree is the data randomness degree of inter-packet difference data in a network data packet sent by a identified smart device. According to the smart device identifying method and system, the electronic device, and the storage medium, identity recognition of a smart device can be realized by discrimination of network layer information that is not (Continued)

susceptible to counterfeiting, to ensure that an object served by a cloud server is legitimate and safe.

11 Claims, 4 Drawing Sheets

(52) U.S. Cl.
CPC ............ *H04L 9/32* (2013.01); *H04L 63/0272* (2013.01); *H04L 63/08* (2013.01); *H04L 63/1466* (2013.01); *H04L 2463/081* (2013.01)

(56) References Cited

U.S. PATENT DOCUMENTS

| | | | | |
|---|---|---|---|---|
| 2018/0270229 | A1* | 9/2018 | Zhang | H04L 69/22 |
| 2019/0334865 | A1* | 10/2019 | Nagarajan | H04L 63/0272 |
| 2020/0076799 | A1* | 3/2020 | Lackey | G06F 21/73 |
| 2021/0152532 | A1* | 5/2021 | Reinhold | H04L 9/0643 |
| 2022/0182824 | A1* | 6/2022 | Zheng | H04W 12/122 |

FOREIGN PATENT DOCUMENTS

| | | |
|---|---|---|
| CN | 109617925 A | 4/2019 |
| CN | 109639536 A | 4/2019 |
| CN | 110022308 A | 7/2019 |

OTHER PUBLICATIONS

Aksoy, Ahmet, and Mehmet Hadi Gunes. "Automated iot device identification using network traffic." ICC 2019-2019 IEEE international conference on communications (ICC). IEEE, 2019. (Year: 2019).*
First Office Action of Chinese priority application 201911167125.2.
International Search Report of PCT No. PCT/CN2019/130399.

* cited by examiner

FIG. 1

```
                                                                        201
Determining a first data randomness degree of inter-packet difference
 data in a network data packet sent by a smart device to be identified 202
 Determining an identity of the smart device to be identified based on
    a comparison result between the first data randomness degree and
    a second data randomness degree of inter-packet difference data in
       a network data packet sent by an identified smart device
```

SMART DEVICE IDENTITY RECOGNITION METHOD AND SYSTEM, ELECTRONIC DEVICE, AND STORAGE MEDIUM

CROSS-REFERENCES TO RELATED APPLICATIONS

The present disclosure is a national phase application of International Application No. PCT/CN2019/130399, filed on Dec. 31, 2019, which claims priority to Chinese patent application No. 201911167125.2 filed on Nov. 25, 2019, the entireties of which are herein incorporated by reference.

FIELD

The present application relates to the field of network security, and in particular to a method and a system for identifying a smart device, an electronic device and a storage medium.

BACKGROUND

With development of science and technology and increasing improvement of people's living standards, smart devices have begun to enter thousands of families, and have become new favorites in people's daily life due to their convenient use and flexible operation.

A smart device generally needs to be connected with a cloud server. Through the connection with the cloud server, the smart device may receive control commands transmitted by the user terminal, transmit real-time information to the user terminal, and receive the latest version of software data.

In some embodiments, a smart device establishing a connection with a cloud server is to identify the identity of the smart device by the cloud server. Identifying the smart device by the cloud server can ensure the "legitimacy" of the smart device served by the cloud server, to prevent some unknown devices from occupying resources of the cloud server.

In the prior art, identifying a smart device by a cloud server mainly relies on application layer information such as the smart device ID and MAC address. Application layer information is easy to be counterfeited and traditional identifying method has security risks. For example, hackers can connect to the cloud server with unknown device by counterfeiting use the ID, MAC address and other information of the smart device to, occupy the cloud server resources, and even launch an attack against the cloud server.

In addition to smart devices, cloud servers used to provide services for other types of smart devices such as tablets, smart phones, smart bracelets, etc. will also encounter similar problems, requiring methods and systems that can effectively identify the identity of smart devices.

SUMMARY

The present application is intended to address at least one of the problems in the prior art. The present application provides a method for identifying a smart device to solve the defect that the application layer information is easy to be counterfeited for identity recognition in the prior art.

The present application further provides a method for identifying a smart device.

The present application further provides a system for identifying a smart device.

The present application further provides an electronic device.

The present application further provides a non-transitory computer-readable storage medium.

The method for identifying the smart device according to an embodiments of the present application includes:

determining a first data randomness degree of inter-packet difference data in a network data packet sent by a smart device to be identified; and determining an identity of the smart device to be identified based on a comparison result between the first data randomness degree and a second data randomness degree, and the second data randomness degree is a data randomness degree of inter-packet difference data in a network data packet sent by a identified smart device, the data randomness degree indicating an randomness degree of generating the inter-packet difference data According to the method for identifying the smart device of an embodiment of the present application, the identity of the smart device may be identified by discriminating network layer information that is not easy to be counterfeited, ensuring that the objects served by the cloud server are legal and safe, preventing resources of the cloud server being occupied by a counterfeiting smart device and avoiding security threatening to the cloud server from hacker attack tools.

According to an embodiment of the present application, the determining an identity of the smart device to be identified based on a comparison result between the first data randomness degree and a second data randomness degree includes:

determining the identity of the smart device to be identified based on a comparison result between a first characteristic value extracted from a transport layer message sent by the smart device to be identified and a second characteristic value extracted from a transport layer message sent by the identified smart device, when an absolute value of a difference between the first data randomness degree and the second data randomness degree is between a first threshold and a second threshold The first threshold is configured to indicate that the smart device to be identified has a same identity as the identified smart device, the second threshold is configured to determine that the smart device to be identified has the different identity from the identified smart device and the transport layer message is a transport layer messages with an inter-packet difference.

According to the method for identifying the smart device of an embodiment of the present application, by discriminating network layer information that is not easy to be counterfeited, the identity of the smart device may be identified, a smart device having an identity which cannot be identified through network layer information may be further identified, ensuring that the objects served by the cloud server are legal and safe, preventing resources of the cloud server being occupied by a counterfeiting smart device and avoiding security threatening to the cloud server from hacker attack tools.

According to an embodiment of the present application, the determining an identity of the smart device to be identified based on a comparison result between the first data randomness degree and a second data randomness degree includes:

determining that the smart device to be identified has the same identity as the identified smart device when the absolute value of a difference between the first data randomness degree and the second data randomness degree is less than or equal to the first threshold, and the first threshold is configured to determine that the smart device to be identified has the same identity as the identified smart device According to an embodiment of the present application, the determining an identity of the smart device to be identified based on a comparison result between the first data randomness degree and a second data randomness degree includes:

determining that the smart device to be identified has a different identity from the identified smart device when the absolute value of a difference between the first data randomness degree and the second data randomness degree is equal to or greater than the second threshold, and the second threshold is configured to indicate that the smart device to be identified has a different identity from the identified smart device According to an embodiment of the present application, each of the first data randomness degree and the second data randomness degree is information entropy;

correspondingly, the determining a first data randomness degree of inter-packet difference data in a network data packet sent by a smart device to be identified includes:

determining the number of occurrence of each character in the inter-packet difference data in the network data packet and a sum of the number of occurrences of all characters; and calculating the information entropy based on the number of occurrence of each character and the sum of the number of occurrences of all characters.

According to an embodiment of the present application, the information entropy is calculated by the following equation:

$$H = -\sum P(x)\log_2 P(x);$$
$$P(x) = \frac{num(x)}{TotalCount}$$

where H represents information entropy; P(x) represents the ratio of the number of occurrence of character x to the sum of number of occurrences of all characters; num(x) represents the number of occurrences of character x; TotalCount represents the sum of number of occurrences of all characters.

According to an embodiment of the present application, the first characteristic value and the second characteristic value are values of fields in a handshake message of a transport layer security protocol.

According to an embodiment of the present application, the first characteristic value and the second characteristic value are values of fields of Version, Cipher Suites, Extensions Length, elliptic_curves, and ec_point_formats in client hello message of the transport layer security protocol.

The method for identifying the smart device according to an embodiment of the present application includes:

sending a network data packet to allow a cloud server to determine a first data randomness of the inter-packet difference data in the network data packet, and determining an identity of the smart device to be identified based on a comparison result between the first data randomness degree and a second data randomness degree, and the second data randomness degree is a data randomness degree of inter-packet difference data in a network data packet sent by a identified smart device and the data randomness degree is configured to indicate an randomness degree of generating the inter-packet difference data.

According to the method for identifying the smart device of an embodiment of the present application, the identity of the smart device may be identified by discriminating network layer information that is not easy to be counterfeited, ensuring that the objects served by the cloud server are legal and safe, preventing resources of the cloud server being occupied by a counterfeiting smart device and avoiding security threatening to the cloud server from hacker attack tools.

A system for identifying a smart device according to the embodiment of the present application includes a smart device and a cloud server; and the smart device is in communication connection with the cloud server;

the cloud server is configured to perform the method for identifying the smart device according to the embodiment of the present application; and the smart device is configured to perform the method for identifying the smart device according to the embodiment of the present application.

According to the smart device identity recognition system of an embodiment of the present application, the identity of the smart device may be identified by discriminating network layer information that is not easy to be counterfeited, ensuring that the objects served by the cloud server are legal and safe, preventing resources of the cloud server being occupied by a counterfeiting smart device and avoiding security threatening to the cloud server from hacker attack tools.

The electronic device according to the embodiment of the present application includes a memory, a processor, and computer programs stored in the memory and to run on the processor, and the processor executes the computer programs to implement the method for identifying the smart device as described in the embodiment of the present application, or the method for identifying the smart device described in the embodiment of the present application.

A non-transitory computer-readable storage medium according to the embodiment of the present application on which computer programs are stored, and the computer programs are executed by a processor implement the method for identifying the smart device as described in the embodiment of the present application, or the method for identifying the smart device described in the embodiment of the present application.

The one or more of the embodiments of the present application have at least one of the following effects: the identity of the smart device may be identified by discriminating network layer information that is not easy to be counterfeited, to ensure that the objects served by the cloud server are legal and safe, preventing resources of the cloud server being occupied by a counterfeiting smart device and avoiding security threatening to the cloud server from hacker attack tools.

Further, by discriminating network layer information that is not easy to be counterfeited, a smart device having an identity which cannot be identified through network layer information may be further identified, to ensure that the objects served by the cloud server are legal and safe, preventing resources of the cloud server being occupied by a counterfeiting smart device and avoiding security threatening to the cloud server from hacker attack tools.

The embodiments of this application will be partially given in the following description, and some thereof will be understood through the practice of this application.

BRIEF DESCRIPTION OF THE DRAWINGS

In order to more clearly illustrate the embodiments of the present application, the drawings used in the descriptions of the embodiments will be briefly described below. The drawings in the following description are only some embodiments of the present application.

DETAILED DESCRIPTION OF THE DISCLOSURE

Embodiments of the present application are further described in detail below with reference to the drawings and embodiments. The following embodiments are intended to illustrate the application, but are not intended to limit the scope of the application.

In the description of this specification, descriptions with reference to the terms "one embodiment", "some embodiments", "examples", "specific examples", or "some examples" etc. mean that specific features, structure, materials or characteristics described in conjunction with the embodiment or example are included in at least one embodiment or example of the embodiments of the present application. In this specification, the schematic expressions of the above terms do not necessarily refer to the same embodiment or example. Also, the described specific features, structures, materials or characteristics can be combined in any one or more embodiments or examples in a suitable manner. Moreover, the terms "first", "second", "third", and the like are used for descriptive purposes only and are not to be construed as indicating or implying relative importance.

Figure 1:
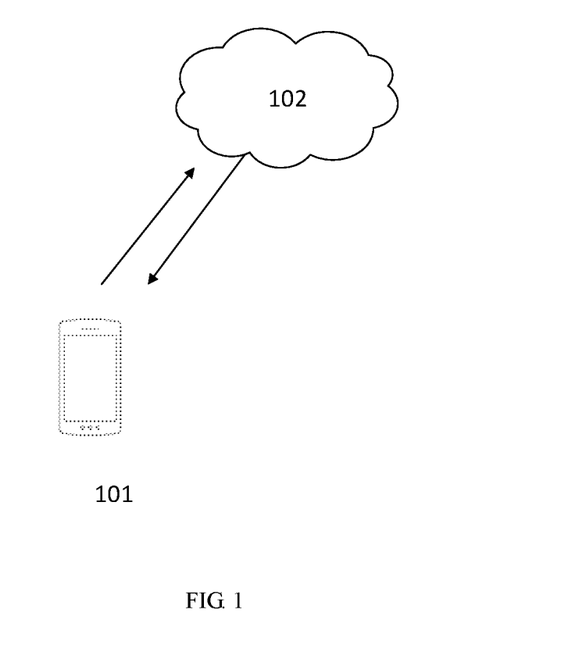
FIG. 1 is a schematic diagram of a connection between a smart device and a cloud server.

FIG. 1 is a schematic diagram of the connection between a smart device and a cloud server. As shown in FIG. 1, the smart device 101 can establish a network connection with the cloud server 102. After the network connection is established, the cloud server 102 needs to identify an identity of the smart device 101 to prevent counterfeit smart devices from occupying resources of the cloud server 102 or to prevent a smart device from being used as a hacker attack tool to attack the cloud server. The smart devices include devices with computing processing capabilities such as smart phones, computers, tablets, and smart wearable devices (smart watches, smart glasses, smart bracelets), as well as smart devices such as refrigerators, air conditioners, washing machines, microwave ovens, dust collectors, smoke exhaust ventilators, and smart speakers having networking functions.

The identity of the smart device can be identified based on the method for identifying the smart device, a smart device identity recognition system, an electronic device, and a storage medium according to the embodiments of the present application. Further explanation is given below.

Figure 2:
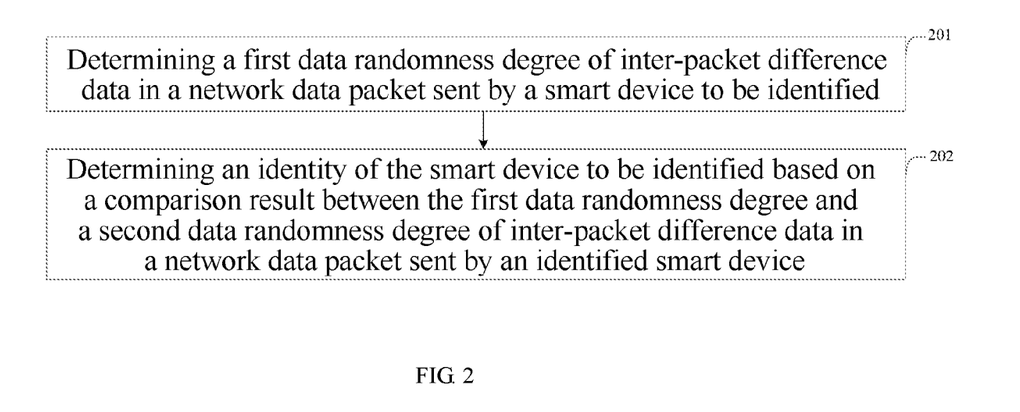
FIG. 2 is a flowchart of a method for identifying a smart device according to an embodiment of the present application.

FIG. 2 is a flowchart of a method for identifying a smart device according to an embodiment of the present application. As shown in FIG. 2, the method for identifying a smart device according to an embodiment of the present application, applied in a cloud server, includes:

step 201, determining a first data randomness degree of inter-packet difference data in a network data packet sent by a smart device to be identified;

After the smart device to be identified has established a connection with the cloud server, the smart device to be identified can send network data packets to the cloud server. After receiving these network data packets, the cloud server extracts data from the network data packets and calculates the first data randomness degree of the extracted data.

In the network data packets sent by different smart devices, there are some common data, such as the 4-bit version number configured to describe the IP protocol version in the IP protocol data packet, and the 32-bit source address and 32-bit destination address in the IP protocol data packet (source address and destination address of network data packets sent by different smart devices may be the same); as well as some personalized data, such as Window Size field, a preset value of 8-bit time to live (TTL), and a maximum of a packet hop count for a packet to reach the destination in the IP protocol data packet, and the specific content of the IP protocol data packet.

In an embodiment of the present application, the data extracted from the network data packet cannot only contain common data, otherwise the data in the network data sent by different smart devices will have the same first data randomness degree, and it would be impossible to identify smart devices according to the data randomness degree. Therefore, the data extracted from the network data packet should be personalized data to distinguish different network data packets, or a set of the personalized data to distinguish different network data packets and common data in network data packets. In an embodiment of the present application, the personalized data to distinguish different network data packets, or the set of personality data and common data is referred to as inter-packet difference data.

When extracting inter-packet difference data from network data packets, the amount of extracted data should be moderate. Excessive extracted amount causes a workload of calculating the data randomness degree to increase accordingly, to increase the calculation load; while less extracted amount will weaken a basis on which the data randomness degree is calculated and thus the accuracy of data randomness degree will be affected. In an embodiment of the present application, inter-packet difference data are extracted by the cloud server from network data packets received within 5 seconds after a connection between the smart device to be identified and the cloud server is established. In another embodiment of the present application, inter-packet difference data are extracted from network data packets received within another duration after a connection between the smart device to be identified and the cloud server is established.

The data randomness degree is configured to indicate the randomness degree of generating data, and the randomness degree of generating data can be indicated by the types of characters that make up the data and the frequency of occurrence of each character. For example, if a piece of data is randomly generated, each character contained in the data should have roughly equivalent frequency of occurrence according to the laws of mathematical statistics as long as the statistical sample is large enough. Such data will have relatively high randomness degree. Conversely, if the data is not randomly generated, for example as in an English book, all English letters contained in the book have different the frequency of occurrence due to the regularity of English words and thus such data will have relatively low randomness degree. Therefore, the data randomness degree can be calculated through statistics on the type and frequency of the characters contained in the data.

In an embodiment of the present application, the first data randomness degree is represented by information entropy. The information entropy of the data in the network data packet can be calculated as follows:

calculating the number of occurrence of each character in the data in the network data packet and a sum of the number of occurrences of all characters; and calculating the information entropy based on the number of occurrence of each character and the sum of the number of occurrences of all characters by the following equation:

$$H = -\sum P(x)\log_2 P(x);$$
$$P(x) = \frac{num(x)}{TotalCount}$$

where H represents information entropy; P(x) represents the ratio of the number of occurrence of character x to the sum of number of occurrences of all characters; num(x) represents the number of occurrences of character x; TotalCount represents the sum of number of occurrences of all characters.

In an embodiment of the present application, the characters may be letters, numbers, symbols, and so on.

The information entropy calculated according to the above equation has a value within a range of 0 to 1, and the closer the value is to 1, the greater the data randomness degree.

In another embodiment of the present application, the first data randomness degree may also be calculated by other methods. For example, the data randomness degree can be determined according to the occurrence of the vowels a, e, i, o, and u in the network data packet.

Step 202, determining an identity of the smart device to be identified based on a comparison result between the first data randomness degree and a second data randomness degree of inter-packet difference data in a network data packet sent by a identified smart device.

The identified smart device refers to the identity of the smart device has been identified. In an embodiment of the present application, the identity information includes type information.

The type information includes information such as the brand and type of the smart device. Smart devices with different brands are provided by different manufacturers, and generally use significantly different communication protocols, compilation environment, and communication contents and thus data in the network data packets sent by smart devices with different brands will have significantly difference in data randomness degrees, accordingly. Different brands of smart devices can be identified based on the difference in data randomness degrees.

Different types of smart devices, such as a refrigerator and an air conditioner, belong to different categories. Even if they are of the same brand, the communication protocols used by them will inevitably have different implementation details due to the different operating principles thereof. Communication contents between different types of smart devices and the cloud server is usually different. For example, the smart smoke exhaust ventilator transmits recipe information between the cloud server while the smart air conditioner transmits temperature information between the cloud server. Whether the difference in the implementation details of the communication protocol or the difference in the communication contents will cause some differences in the data randomness degree of the data in the network data packets sent by different types of smart devices. Different types of smart devices can be identified based on the difference in data randomness degrees.

Smart devices of the same brand and type may have models, and the communication protocols used by different models of smart devices may have different implementation details. For example, the OpenSSL protocol used by a model A of a smart refrigerator has a version number of OpenSSL-0.9.8m, while the OpenSSL protocol used by a model B thereof has a version number of OpenSSL-1.0.1c. Data packet headers generated by the two different versions of the OpenSSL protocol will have somewhat different contents. If the communication protocols used by different types of smart devices have different implementation details, the data in the network data packets sent by the different types of smart devices will have significantly different data randomness degrees. In this case, the type information configured to identify the identity further includes the model information of the smart device.

For smart devices of the same brand, same type, and same model, if communication protocols used in some production batches of smart devices and other production batches of smart devices have different implementation details, the data in the network data packets sent by these smart devices will have different data randomness degrees. In this case, the type information configured to identify the identity further includes the production batch information of the smart device. For example, the OpenSSL protocol used by one or some production batches of a model of a smart refrigerator has a version number of OpenSSL-0.9.8m, and the OpenSSL protocol used by other production batches of the same model of the refrigerator has a version number of OpenSSL-1.0.1c. Data packet headers generated based on the two different versions of the OpenSSL protocol will have somewhat different contents and thus the data in the network data packets sent by the different batches of products based on the different protocol version numbers will have significantly difference in data randomness degrees. In this case, the type information configured to identify the identity further includes the production batch information of the smart device.

The identified smart device are not limited to one type, but can be multiple types, such as a brand or model of air conditioner, a brand or model of refrigerator, and a brand or model of washing machine.

The second data randomness degree of the data in the network data packet sent by the identified smart device may be pre-calculated and stored, or may be calculated in real-time before or during the execution of step 202. In an embodiment of the present application, the second data randomness degree can be pre-calculated and stored. As mentioned in the previous, a identified smart device is not limited to one type. Therefore, the second data randomness degree can be a set including the second data randomness degrees of different types of smart devices, such as the second data randomness degrees of all types of smart devices served by the cloud server.

In an embodiment of the present application, the second data randomness degree of the data in the network data packet sent by the identified smart device can be represented by information entropy. The information entropy is obtained by whether a pre-calculation method or a real-time calculation method, the calculation method for the information entropy of the data in the network data packet sent by the identified smart device is the same as that for the information entropy of the data in the network data packet sent by the smart device to be identified. The description will not be repeated here. In another embodiments of the present application, the second data randomness degree may also be calculated by other methods. For example, the data randomness degree is determined according to the occurrence of the vowels a, e, i, o, and u in the network data packet. It should be noted that the calculation method of the second data randomness degree should be the same as that of the first data randomness degree, so that both can be compared.

It should be noted that when data for calculating information entropy are extracted from network data packets sent by a identified smart device before calculating information entropy, the data extracted should have the same amount as that of data extracted from network data packets sent by the smart device to be identified. For example, in step 201, data are extracted by the cloud server from network data packets received within 5 seconds after a connection between the smart device to be identified and the cloud server is established while in the present step, data are extracted by the cloud server from network data packets received also within 5 seconds after a connection between the identified smart device and the cloud server is established.

The comparison between the first data randomness degree and the second data randomness degree is performed by taking the absolute value of difference between the first data randomness degree and the second data randomness degree to obtain the comparison result. The obtained comparison result is compared with the first threshold and the second threshold. It is indicated that the smart device to be identified and the identified smart device have the same identity when the comparison result is less than or equal to the first threshold; it is indicated that the smart device to be identified and the identified smart device have different identities when the comparison result is equal to or greater than the second threshold; and the identity of the smart device to be identified cannot be determined yet when the comparison result is between the first threshold and the second threshold. The first threshold is configured to determine that the smart device to be identified has the same identity as the identified smart device, and the second threshold is configured to determine that the smart device to be identified has the different identity from the identified smart device.

In an embodiment of the present application, a difference between the information entropy (which represents the first data randomness degree) of the data in the network data packet sent by the smart device to be identified and the information entropy (which represents the randomness of the second data) of the data in the network data packet sent by the identified smart device can be calculated, and an absolute value of the difference can be used as the comparison result. The first threshold has a size of 0.1, and the second threshold has a size of 0.2. It is indicated that the smart device to be identified and the identified smart device have the same identity when the comparison result is less than 0.1; it is indicated that the smart device to be identified and the identified smart device have different identities when the comparison result is greater than 0.5; and the identity of the smart device to be identified cannot be determined yet when the comparison result is between 0.1 and 0.5. In another embodiment of the present application, the first threshold and the second threshold may be adjusted accordingly according to actual conditions.

In some embodiments, the identity information also includes an identification result of whether the smart device is a device that the cloud server needs to serve, such as a true device or a counterfeit device. In some applications, users do not care about the brand, type, or model, production batch and other information of the smart device to be identified, but only need to know whether the device is a true device or a counterfeit device.

For such applications, during the determination of the identity of the smart device to be identified, a conclusion that the smart device to be identified is a true device or a counterfeit device may be directly given according to the comparison result between the second data randomness degree of the data in the network data packet sent by the identified smart device and the first data randomness degree For example, the comparison result is obtained by taking an absolute value of a difference between the first data randomness degree and the second data randomness degree. The obtained comparison result is compared with the first threshold and the second threshold. It is indicated that the smart device to be identified is a true device when the comparison result is less than or equal to the first threshold; it is indicated that the smart device to be identified is a counterfeit device when the comparison result is equal to or greater than the second threshold; and that whether the smart device to be identified is a true device cannot be determined yet when the comparison result is between the first threshold and the second threshold.

It should be noted that a further processing, for example, interrupting the established network connection with the smart device to be identified may be performed when the smart device to be identified and the identified smart device have different identities, and the identified smart device includes a wide range of types of smart devices, such as all types of smart devices served by the cloud server. Furthermore, the prerequisite for establishing a network connection between the smart device to be identified and the cloud server is that the smart device to be identified may provide legal network connection authentication information, such as smart device ID, MAC address and other information, and these devices to provide legal network connection authentication information and unable to pass identity authentication may be added to the blacklist as counterfeit devices or suspected hacker attack tools, and connection of these devices in the blacklist can be refused by the cloud server.

The method for identifying the smart device according to an embodiment of the present application are described above. The method for identifying the smart device according to an embodiment of the present application may be used alone, or may be used in combination with the identity recognition method using smart device ID, MAC address and other information in prior art.

In the method for identifying the smart device according to the embodiments of the present application, the identity can be identified by calculating data randomness degree for network layer information and based on the calculated data randomness degree. If a counterfeiter wants to counterfeit by modifying the network layer information and not to be discovered by the method for identifying the smart device according to the embodiment of the present application, the counterfeiter can only replace characters in the original network layer information with characters with approximate randomness degree. However, it is very limited for characters having approximate randomness degree that may be selected by the counterfeiter due to the restriction of word formation or usage habits or grammatical rules and thus the replaced network layer information is generally meaningless. For example, original data is TTIS IISS a BBOOKK, if the character T should be replaced and the data randomness degree of the replaced data should be similar to that of the original data, then according to the number and frequency of each letter in English, T may be only replaced with G. That is, the original data TTIS IISS a BBOOKK is transformed into GGIS IISS a BBOOKK, and the replaced data is meaningless.

According to the method for identifying the smart device of an embodiment of the present application, the identity of the smart device may be identified by discriminating network layer information that is not easy to be counterfeited, to ensure that the objects served by the cloud server are legal and safe, preventing resources of the cloud server being occupied by a counterfeiting smart device and avoiding hacker attack tools from threatening the cloud server's security.

Figure 3:
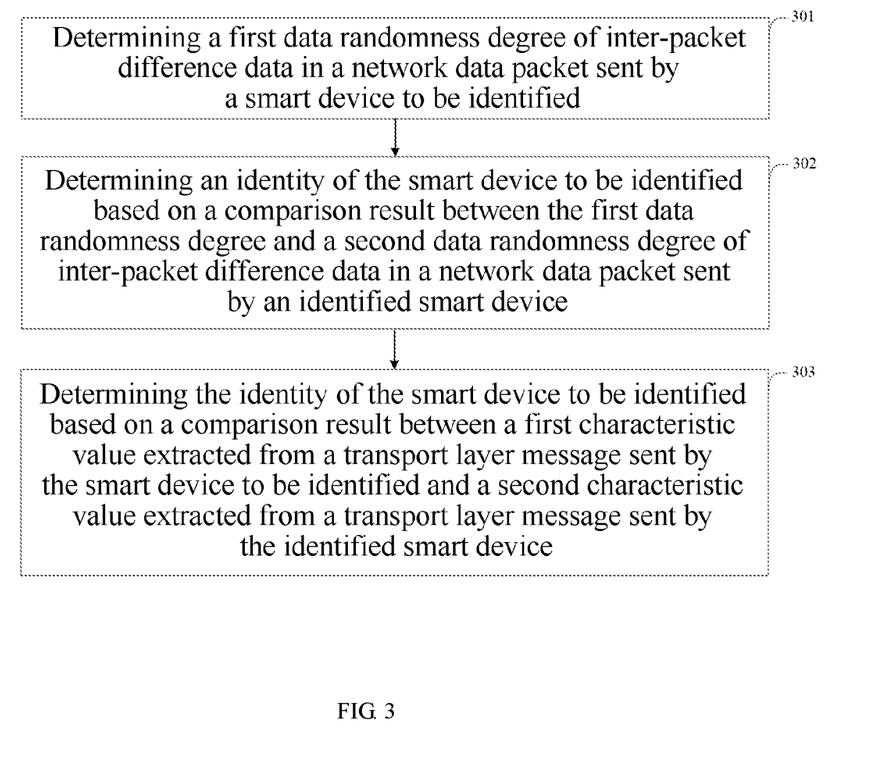
FIG. 3 is a flowchart of a method for identifying a smart device according to another embodiment of the present application.

Based on any of the above embodiments, FIG. 3 is a flowchart of a method for identifying the smart device according to another embodiment of the present application. As shown in FIG. 3, the method for identifying the smart device according to another embodiment of the present application, applied in a cloud server, the method includes:

step 301, determining a first data randomness degree of inter-packet difference data in a network data packet sent by a smart device to be identified;

step 302, determining an identity of the smart device to be identified based on a comparison result between the first data randomness degree and a second data randomness degree of inter-packet difference data in a network data packet sent by a identified smart device; and step 303, determining the identity of the smart device to be identified based on a comparison result between a first characteristic value extracted from a transport layer message sent by the smart device to be identified and a second characteristic value extracted from a transport layer message sent by the identified smart device.

As mentioned in the previous embodiments of the present application, it is impossible to determine whether the identity of the smart device to be identified and the identified smart device have the same type yet and that whether the smart device to be identified is a true device yet when the comparison result between the first data randomness degree and the second data randomness degree of the data in the network data packet sent by the identified smart device is between the first threshold and the second threshold. In an embodiment of the present application, the smart device to be identified that cannot be determined based on the data randomness degree can be further determined.

TLS (Transport Layer Security) protocol is a security protocol that provides security and data integrity protection for Internet communications. TLS includes many types of messages, such as client hello, server hello, and so on. Among the TLS messages sent by different smart devices, some messages may have the same content, such as Protocol Version, while other messages have different content, such as Cipher Suite (key algorithm suite). When extracting data from a message to form a characteristic value, rather than just extracting data from a message with the same content, data should be extracted from a message with different content to form a characteristic value, or extracted from both a message with the same content and a message with different content to form a characteristic value. In an embodiment of the present application, these transport layer messages with different content, or a set of transport layer messages with the same content and transport layer messages with different content are referred to as transport layer messages with inter-packet difference.

In an embodiment of the present application, the client hello is selected, and the value of the related field is extracted therefrom to form the characteristic value. A characteristic value extracted from a handshake message of the transport layer security protocol sent by the smart device to be identified is referred to as a first characteristic value, and a characteristic value extracted from a handshake message of the transport layer security protocol sent by the identified smart device is referred to as a second characteristic value. The second characteristic value may be pre-calculated and stored, or may be calculated in real time before or during execution of this step. In an embodiment of the present application, the second characteristic value is pre-calculated and stored.

In an embodiment of the present application, fields extracted from the client hello message include Version, Cipher Suites, Extensions Length, elliptic_curves, and ec_point_formats. In another embodiment of the present application, one or more fields can be selected from the above five fields to form a characteristic value. However, it should understand that the misjudgment rate in subsequent identity identification operations using the characteristic value is inversely proportional to the number of fields forming the characteristic value.

In another embodiment of the present application, other types of transport layer messages may be used to generate the characteristic value. For example, the TTL (Time to Live) field and the WindowSize field in the TCP (Transmission Control Protocol) packet can be used to generate the characteristic value.

The first characteristic value is compared with the second characteristic value, and it is indicated that the smart device to be identified and the identified smart device have the same type when the first and second characteristic values are consistent. On the contrary, it is indicated that the smart device to be identified and the identified smart device do not have the same type when the first and second characteristic values are inconsistent.

A method for identifying the smart device according to an embodiment of the present application are described above. According to the method for identifying the smart device of an embodiment of the present application, the identity of the smart device may be identified by discriminating network layer information that is not easy to be counterfeited, the identity of the smart device, which is impossible to be identified through network layer information may be further identified by discriminating transport layer information that is not easy to be counterfeited, ensuring that the objects served by the cloud server are legal and safe, preventing resources of the cloud server being occupied by a counterfeiting smart device and avoiding hacker attack tools from threatening the cloud server's security.

Figure 4:
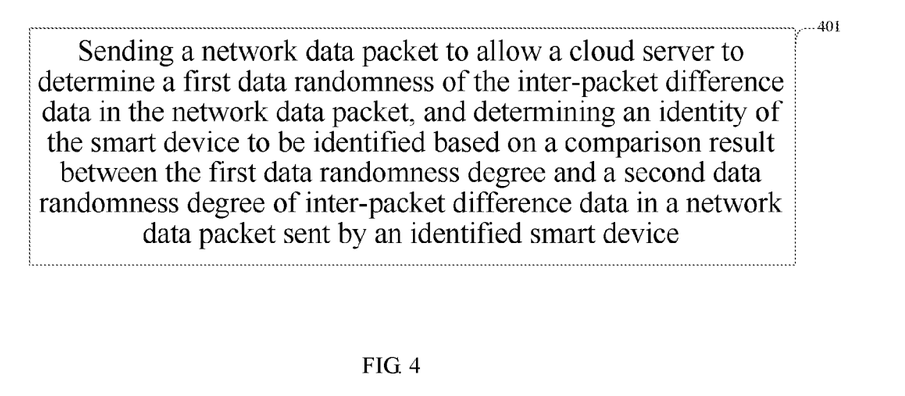
FIG. 4 is a flowchart of a method for identifying a smart device according to an embodiment of the present application.

Based on any of the above embodiments, FIG. 4 is a flowchart of a method for identifying the smart device according to an embodiment of the present application. As shown in FIG. 4, the method for identifying the smart device according to the embodiment of the present application, applied in a smart device to be identified, the method includes:

step 401, sending a network data packet to allow a cloud server to determine a first data randomness degree of the inter-packet difference data in the network data packet, and determining an identity of the smart device to be identified based on a comparison result between the first data randomness degree and a second data randomness degree of inter-packet difference data in a network data packet sent by a identified smart device.

The smart device to be identified sends a network data packet to the cloud server after establishing a connection with the cloud server. After receiving the network data packet, the cloud server extracts the inter-packet difference data from the network data packet, and calculates the first data randomness degree for the extracted data. The first data randomness degree may be information entropy, or may be a data randomness degree calculated based on the occurrence of the vowels a, e, i, o, and u in the network data packet.

After the first data randomness degree is obtained, the first data randomness is compared with the second data randomness obtained based on the inter-packet difference data in the network data packets sent by the identified smart device, and identity of the smart device to be identified is determined based on the comparison result. If the identity cannot be determined, the characteristic value in a transport layer message sent by the smart device to be identified may be further extracted, and the characteristic value may be compared with a characteristic value extracted from a transport layer message sent by the identified smart device, and the identity of the smart device to be identified is determined based on the comparison result.

According to the method for identifying the smart device of an embodiment of the present application, the identity of the smart device may be recognized by discriminating network layer information that is not easy to be counterfeited, ensuring that the objects served by the cloud server are legal and safe, preventing resources of the cloud server being occupied by a counterfeiting smart device and avoiding hacker attack tools from threatening the cloud server's security.

Figure 5:
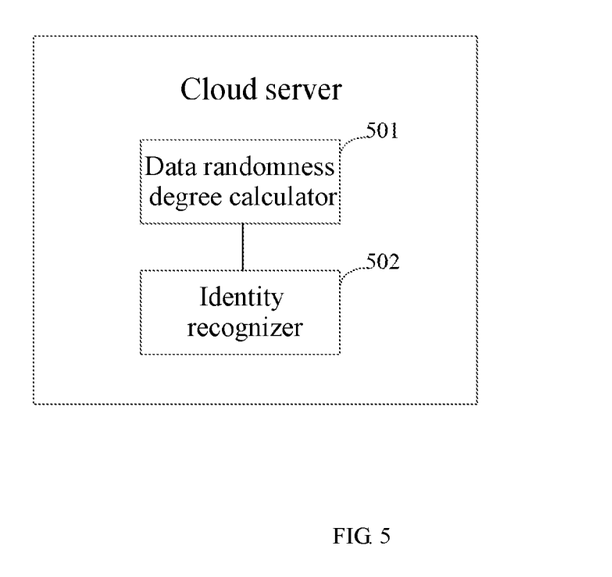
FIG. 5 is a schematic diagram of a cloud server according to an embodiment of the present application.

Based on any of the foregoing embodiments, FIG. 5 is a schematic diagram of a cloud server according to an embodiment of the present application. As shown in FIG. 5, the cloud server according to an embodiment of the present application includes:

a data randomness degree calculator 501 configured to determine a first data randomness degree of inter-packet difference data in a network data packet sent by a smart device to be identified; and an identity recognizer 502 configured to determine an identity of the smart device to be identified based on a comparison result between the first data randomness degree and a second data randomness degree of inter-packet difference data in a network data packet sent by a identified smart device.

According to the cloud server of an embodiment of the present application, the identity of the smart device may be recognized by discriminating network layer information that is not easy to be counterfeited, ensuring that the objects served by the cloud server are legal and safe, preventing resources of the cloud server being occupied by a counterfeiting smart device and avoiding hacker attack tools from threatening the cloud server's security.

Figure 6:
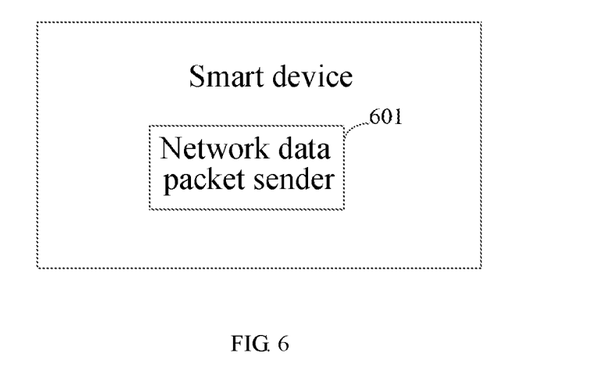
FIG. 6 is a schematic diagram of a smart device according to an embodiment of the present application.

Based on any of the foregoing embodiments, FIG. 6 is a schematic diagram of a smart device according to an embodiment of the present application. As shown in FIG. 6, the smart device according to an embodiment of the present application includes:

a network data packet sender 601 configured to send a network data packet and a cloud server receives the network data packet, calculates a first data randomness degree of inter-packet difference data in the network data packet, and determines an identity of the smart device to be identified based on a comparison result between the first data randomness degree and a second data randomness degree of inter-packet difference data in a network data packet sent by a identified smart device.

The smart device according to an embodiment of the present application sends the network data packet to the cloud server, the identity of the smart device may be identified by discriminating network layer information that is not easy to be counterfeited through the cloud server, ensuring that the objects served by the cloud server are legal and safe, preventing resources of the cloud server being occupied by a counterfeiting smart device and avoiding hacker attack tools from threatening the cloud server's security.

Figure 7:
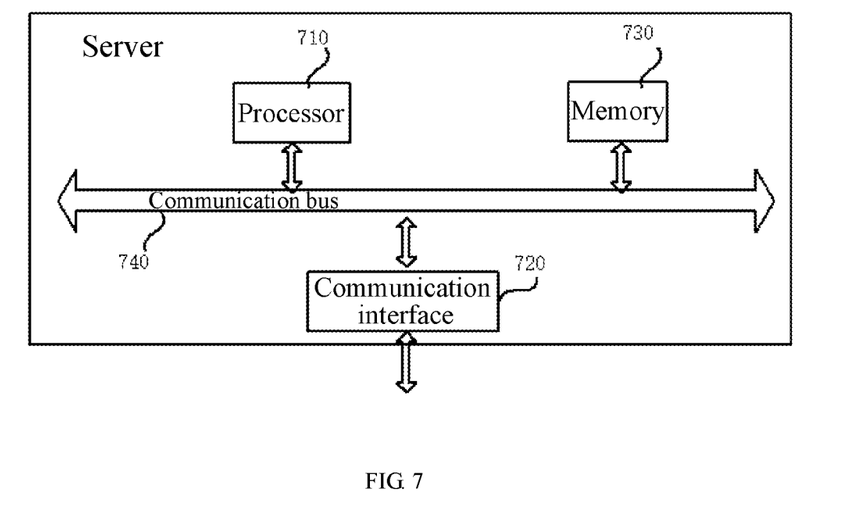
FIG. 7 illustrates a schematic diagram of the physical structure of an electronic device.

FIG. 7 is a schematic diagram of the physical structure of an electronic device. As shown in FIG. 7, the electronic device may include a processor 710, a communication interface 720, a memory 730, and a communication bus 740. The processor 710, the communication interface 720, and the memory 730 communicate with each other through the communication bus 740. The processor 710 may call logic instructions in the memory 730 to execute the following method: receiving a network data packet sent by a smart device to be identified, calculating a first data randomness degree of inter-packet difference data in the network data packet, and determining an identity of the smart device to be identified based on a comparison result between the first data randomness degree and a second data randomness degree of inter-packet difference data in a network data packet sent by a identified smart device; or execute the following method: sending a network data packet for being received, calculating a first data randomness degree of inter-packet difference data in the network data packet, and determining an identity of the smart device to be identified based on a comparison result between the first data randomness degree and a second data randomness degree of inter-packet difference data in a network data packet sent by a identified smart device.

In addition, the logic instructions in the memory 730 described above may be implemented in the form of a software functional unit and may be stored in a computer readable storage medium while being sold or used as a separate product. Based on such understanding, the embodiments of the present disclosure, which is essential or contributes to the prior art, may be embodied in the form of a software product, which is stored in a storage medium, including several instructions to cause a computer device (which may be a personal computer, server, or network device, etc.) to perform all or part of the methods described in various embodiments of the present application. The storage medium described above includes: a U disk, a mobile hard disk, a read-only memory (ROM), a random access memory (RAM), a magnetic disk, or an optical disk, and the like.

Further, an embodiment of the present application discloses a computer program product including computer programs stored on a non-transitory computer-readable storage medium. The computer programs include program instructions and a computer may perform the method according to embodiments of the present application when executing the program instructions, for example, including: receiving a network data packet sent by a smart device to be identified, calculating a first data randomness degree of inter-packet difference data in the network data packet, and determining an identity of the smart device to be identified based on a comparison result between the first data randomness degree and a second data randomness degree of inter-packet difference data in a network data packet sent by a identified smart device; or including: sending a network data packet for being received, calculating a first data randomness degree of inter-packet difference data in the network data packet, and determining an identity of the smart device to be identified based on a comparison result between the first data randomness degree and a second data randomness degree of inter-packet difference data in a network data packet sent by a identified smart device.

On the other hand, an embodiment of the present application discloses a non-transitory computer-readable storage medium on which computer programs is stored, and the computer programs are executed by a processor to perform the method according to embodiments of the present application, for example, including: receiving a network data packet sent by a smart device to be identified, calculating a first data randomness degree of inter-packet difference data in the network data packet, and determining an identity of the smart device to be identified based on a comparison result between the first data randomness degree and a second data randomness degree of inter-packet difference data in a network data packet sent by a identified smart device; or including: sending a network data packet for being received, calculating a first data randomness degree of inter-packet difference data in the network data packet, and determining an identity of the smart device to be identified based on a comparison result between the first data randomness degree and a second data randomness degree of inter-packet difference data in a network data packet sent by a identified smart device.

The device embodiments described above are merely illustrative, the units described as separate components may or may not be physically separate, and the components displayed as units may or may not be physical units, that is, may be located at the same place, or it can be distributed to multiple network units. Some or all of the modules may be selected according to actual needs to achieve the purpose of the solution of the embodiment.

Through the description of the embodiments above, can be implemented by means of software and a necessary general hardware platform, and of course, by hardware. Based on such understanding, the embodiments of the present application, which is essential or contributes to the prior art, may be embodied in the form of a software product, which is stored in a storage medium such as ROM/RAM, magnetic Discs, optical discs, etc., including several instructions to cause a computer device (which may be a personal computer, server, or network device, etc.) to perform various embodiments or a part of the methods described in various embodiments.

What is claimed is:

1. A method for identifying a smart device, comprising:
    determining a first data randomness degree of inter-packet difference data in a network data packet sent by a smart device to be identified; and
    determining an identity of the smart device to be identified based on a comparison result between the first data randomness degree and a second data randomness degree, wherein the second data randomness degree is a data randomness degree of inter-packet difference data in a network data packet sent by an identified smart device, the data randomness degree indicates a randomness degree of generating the inter-packet difference data;
    wherein the determining an identity of the smart device to be identified based on a comparison result between the first data randomness degree and a second data randomness degree further comprises:
    determining the identity of the smart device to be identified based on a comparison result between a first characteristic value extracted from a transport layer message sent by the smart device to be identified and a second characteristic value extracted from a transport layer message sent by the identified smart device, when an absolute value of a difference between the first data randomness degree and the second data randomness degree is between a first threshold and a second threshold; and
    wherein the first threshold is configured to indicate that the smart device to be identified has a same identity as the identified smart device, the second threshold is configured to indicate that the smart device to be identified has a different identity from the identified smart device, and the transport layer message is a transport layer message with an inter-packet difference.

2. The method of claim 1, wherein the determining of the identity of the smart device is identified based on a comparison result between the first data randomness degree and a second data randomness degree further comprises:
    determining that the smart device to be identified has a same identity as the identified smart device when an absolute value of a difference between the first data randomness degree and the second data randomness degree is less than or equal to a first threshold,
    wherein the first threshold is configured to indicate that the smart device to be identified has a same identity as the identified smart device.

3. The method of claim 1, wherein the determining of the identity of the smart device is identified based on a comparison result between the first data randomness degree and a second data randomness degree further comprises:
    determining that the smart device to be identified has a different identity from the identified smart device when an absolute value of a difference between the first data randomness degree and the second data randomness degree is equal to or greater than a second threshold,
    wherein the second threshold is configured to indicate that the smart device to be identified has a different identity from the identified smart device.

4. The method of claim 1, wherein each of the first data randomness degree and the second data randomness degree is information entropy, and the determining a first data randomness degree of inter-packet difference data in a network data packet sent by a smart device is identified comprises:
    determining a number of occurrence of each character in the inter-packet difference data in the network data packet and a sum of the number of occurrence of all characters; and
    calculating the information entropy based on the number of occurrence of each character and the sum of the number of occurrences of all characters.

5. The method of claim 4, wherein the information entropy is calculated by the following equation:

$$H = -\sum P(x)\log_2 P(x);$$
$$P(x) = \frac{num(x)}{TotalCount}$$

where H represents information entropy; P(x) represents a ratio of the number of occurrence of character x to the sum of number of occurrences of all characters; num(x) represents the number of occurrence of character x; TotalCount represents the sum of number of occurrence of all characters.

6. The method of claim 1, wherein the first characteristic value and the second characteristic value are values of fields in a handshake message of a transport layer security protocol.

7. The method of claim 6, wherein the first characteristic value and the second characteristic value are values of fields of Version, Cipher Suites, Extensions Length, elliptic_curves, and ec_point_formats in client hello message of the transport layer security protocol.

8. A method for identifying a smart device, comprising:
sending a network data packet to allow a cloud server to determine a first data randomness of the inter-packet difference data in the network data packet; and
determining an identity of the smart device to be identified based on a comparison result between the first data randomness degree and a second data randomness degree, wherein the second data randomness degree is a data randomness degree of inter-packet difference data in a network data packet sent by a identified smart device and the data randomness degree is configured to indicate a randomness degree of generating the inter-packet difference data;
wherein the determining an identity of the smart device to be identified based on a comparison result between the first data randomness degree and a second data randomness degree further comprises:
determining the identity of the smart device to be identified based on a comparison result between a first characteristic value extracted from a transport layer message sent by the smart device to be identified and a second characteristic value extracted from a transport layer message sent by the identified smart device, when an absolute value of a difference between the first data randomness degree and the second data randomness degree is between a first threshold and a second threshold; and
wherein the first threshold is configured to indicate that the smart device to be identified has a same identity as the identified smart device, the second threshold is configured to indicate that the smart device to be identified has a different identity from the identified smart device, and the transport layer message is a transport layer message with an inter-packet difference.

9. A system for identifying a smart device, comprising:
a smart device and a cloud server; wherein the smart device is in communication connection with the cloud server;
wherein the cloud server is configured to perform a method of comprising:
determining a first data randomness degree of inter-packet difference data in a network data packet sent by a smart device to be identified; and
determining an identity of the smart device to be identified based on a comparison result between the first data randomness degree and a second data randomness degree, wherein the second data randomness degree is a data randomness degree of inter-packet difference data in a network data packet sent by an identified smart device, the data randomness degree indicates a randomness degree of generating the inter-packet difference data;
wherein the determining an identity of the smart device to be identified based on a comparison result between the first data randomness degree and a second data randomness degree further comprises:
determining the identity of the smart device to be identified based on a comparison result between a first characteristic value extracted from a transport layer message sent by the smart device to be identified and a second characteristic value extracted from a transport layer message sent by the identified smart device, when an absolute value of a difference between the first data randomness degree and the second data randomness degree is between a first threshold and a second threshold; and
wherein the first threshold is configured to indicate that the smart device to be identified has a same identity as the identified smart device, the second threshold is configured to indicate that the smart device to be identified has a different identity from the identified smart device, and the transport layer message is a transport layer message with an inter-packet difference.

10. An electronic device comprising: a memory, a processor, and processor-executable computer programs stored in the memory and by the processor, wherein the processor is configured to execute the computer programs to perform a method of claim 1.

11. A non-transitory computer-readable storage medium having stored therein a computer program, and wherein the computer programs are executed by a processor to implement a method of claim 1.

* * * * *